United States Patent [19]

Matthews

[11] Patent Number: 4,582,291

[45] Date of Patent: Apr. 15, 1986

[54] MECHANICALLY STABILIZED PLATFORM SYSTEM

[76] Inventor: Robert J. Matthews, 4510 Alhambra Way, Martinez, Calif. 94553

[21] Appl. No.: 694,901

[22] Filed: Jan. 25, 1985

Related U.S. Application Data

[63] Continuation of Ser. No. 258,459, Apr. 28, 1981, abandoned, which is a continuation-in-part of Ser. No. 8,066, Jan. 31, 1979, abandoned.

[51] Int. Cl.$^4$ .................. F16M 13/02; G01C 19/30
[52] U.S. Cl. .................................. 248/550; 248/559; 33/321; 343/765
[58] Field of Search .................. 248/550, 559; 74/5.22, 74/5.34; 343/765, 766, 878; 33/318, 321, 323, 324

[56] References Cited

U.S. PATENT DOCUMENTS

| | | | |
|---|---|---|---|
| 907,907 | 12/1908 | Sperry | 74/5.22 |
| 1,032,022 | 7/1912 | Petravic . | |
| 1,083,370 | 1/1914 | Luyken . | |
| 1,186,856 | 6/1916 | Sperry . | |
| 1,236,993 | 8/1917 | Sperry et al. . | |
| 1,324,477 | 12/1919 | Tanner | 74/5.34 |
| 1,573,028 | 2/1926 | Bates . | |
| 1,573,343 | 2/1926 | Holeka | 74/5.34 |
| 1,621,815 | 3/1927 | Schueller . | |
| 1,645,079 | 10/1927 | Titterington . | |
| 1,906,719 | 5/1933 | Richter . | |
| 1,999,897 | 4/1935 | Fieux . | |
| 2,199,294 | 4/1940 | Seligmann . | |
| 2,425,737 | 8/1947 | Hanna et al. . | |
| 2,477,574 | 8/1948 | Braddon | 343/765 |
| 2,539,772 | 1/1951 | Dawson . | |
| 2,811,042 | 10/1957 | Kenyon . | |
| 2,899,677 | 8/1959 | Rockall | 343/765 X |
| 2,924,824 | 2/1960 | Lanctot et al. | 343/756.5 |
| 3,163,039 | 12/1964 | Newman et al. | 248/184 X |
| 3,262,321 | 7/1966 | Moul | 343/765 X |
| 3,355,954 | 12/1967 | Levine et al. | 74/5.34 |
| 3,742,770 | 7/1973 | Flannelly | 74/5.34 |
| 3,893,123 | 7/1975 | Bieser | 343/706 |
| 4,020,491 | 4/1977 | Bieser et al. | 343/765 |
| 4,118,707 | 10/1978 | Yoshida et al. | 343/765 |
| 4,193,308 | 3/1980 | Stuhler et al. | 74/5.34 X |
| 4,442,435 | 4/1984 | Kiryu et al. | 33/321 X |

FOREIGN PATENT DOCUMENTS

| | | | |
|---|---|---|---|
| 24647 | of 1915 | United Kingdom | 74/5.22 |
| 565 | of 1915 | United Kingdom | 33/324 |
| 212544 | 9/1924 | United Kingdom | 33/321 |
| 460244 | 1/1937 | United Kingdom | 33/324 |
| 797929 | 4/1958 | United Kingdom | 74/5.34 |
| 864751 | 4/1961 | United Kingdom | 343/765 |

Primary Examiner—Ramon S. Britts
Assistant Examiner—Karen Chotkowski
Attorney, Agent, or Firm—Burns, Doane, Swecker and Mathis

[57] ABSTRACT

A compositely statically balanced mechanically stabilized platform system including a stabilizing platform having at least one pivotal axis, an equipment platform, a supporting structure, a pendulum, non-rigid means for orienting the platform with respect to the pendulum, a gyro assembly mounted for rotation about a precession axis perpendicular to a pivotal axis of the platform. The gyro assembly itself is statically balanced about its precession axis and has restraining means for orienting the spin axis of the gyro with respect to the gyro assembly supports. The system further includes an equipment platform preferably mounted remotely from the platform and mechanically connected thereto by a linkage assembly which transmits motion of the stabilizing assembly to the equipment platform. In one embodiment the system is constructed as a single integrated unit. In several embodiments the gyro azimuth frame is supported on bearings which permit unrestrained rotation in the azimuth plane. Another embodiment includes centering means for orienting the statically balanced platform system with respect to the support structure. Still another embodiment utilizes the combination of a non-rigidly coupled auxilary pendulum and centering means coupled to the support structure for orienting the statically balanced platform system.

32 Claims, 11 Drawing Figures

MECHANICALLY STABILIZED PLATFORM SYSTEM

CROSS-REFERENCE TO RELATED APPLICATIONS

This application is a continuation of application Ser. No. 258,459, filed Apr. 28, 1981, now abandoned, which is a continuation-in-part of copending application Ser. No. 008,066, filed Jan. 31, 1979, now abandoned, for MECHANICALLY STABILIZED PLATFORM SYSTEM.

BACKGROUND OF THE INVENTION

This invention relates generally to gyroscopically stabilized platforms, and more specifically to combination-element gyro stabilized platform systems, and specifically to statically balanced, mechanically stabilized platform systems, such as might be used to support directional antennas in mobile applications.

A mechanically stabilized platform system is one in which a gyroscopic torsional impulse absorption system alone is used to absorb disturbing torsional impulses caused by vehicle motions. As used herein a gyroscopic torsional impulse absorption system is defined as comprising gyroscopic apparatus including at least a pair of gyroscopic rotors, means for independently mounting each of said rotors for rotation about one axis and for precession about another axis at an angle to said one axis, and a torque axis mutually perpendicular to both the rotation and precession axes, with said rotation and precession axes of each rotor being respectively parallel or perpendicular to each other so that the torque axes of both of said rotors lie in planes nominally parallel to each other and to a plane which includes centering means operatively connected to each of said axes mounting means.

Mechanically stabilized platform systems can provide a stable mounting platform for devices such as cameras, directional antennas, and sensing and recording instruments when these devices are used on ships, aircraft, and land vehicles. However, direct mechanically stabilized platforms have had only limited use in the past in such applications because they suffered from three major shortcomings: (1) they were relatively inaccurate, (2) they had large and awkward configurations, and (3) they were susceptible to destabilization from yaw/turning and other azimuth motions combined with roll or pitch motions.

One approach to mechanical stabilization in known prior art systems is to orient the platform with respect to the vertical by making the system rigidly pendulous. Examples of such rigidly pendulous systems are disclosed in U.S. Pat. Nos. 1,645,079 to Titterington, 1,083,370 to Luyken, 1,236,993 to Sperry, 1,999,897 Fieux, 2,199,294 to Seligmann, and 4,020,491 to Bieser et al. The pendular effect used to provide such systems with a long term vertical reference orientation results, however, in certain short term disturbances, caused by horizontal accelerations acting on the rigid pendulum. The short term disturbances, although attenuated by gyroscopic action, detract from the overall accuracy obtainable from a mechanically stabilized system of the rigidly pendulous type. The other major accuracy limiting effect of known systems is discussed hereinafter.

The problems associated with pendulosity are avoided by other systems such as those disclosed in U.S. Pat. Nos. 1,032,022 to Petravic, 1,573,028 to Bates, and 2,811,042 to Kenyon, by making such systems statically balanced. However, each of the foregoing systems requires periodic manual adjustment to establish a desired reference orientation. Still other U.S. Pat. Nos. including 1,906,719 to Richter, 1,324,477 to Tanner and 3,742,770 to Flannelly describes statically balanced gyroscopic systems which oriented with respect to their support frames by mechanical springs. The influence of horizontal accelerations acting on a pendulum are avoided by such systems, but in each such system the orientation of the stabilized element changes in correspondence with long term changes in support frame orientation.

U.S. Pat. No. 4,193,308 to Stuhler et al. describes a system which is statically balanced as a whole but in which the gyro assemblies are made individually pendulous. This arrangement is subject to disturbing horizontal accelerations as in rigidly pendulous systems although the horizontal accelerations act effectively at right angles to their normal directions of application.

The large and awkward configuration associated with some prior art systems typically results from constructing the platform system, including the operating equipment, as a single integrated assembly. A single integrated assembly typically requires large amounts of dead counterweight and is thus structurally inefficient. As a result, such systems are characterized by low structural resonant frequencies which result in poor tolerance to vibrations and consequent high vibration stresses on platform equipment. U.S. Pat. No. 2,924,824 to Lanctot et al. discloses a solution to this problem in a servo stabilized system through the use of push-rod assemblies. However, the push-rod assemblies are rotated together with a scanning antenna about a common axis in a integrated assembly, requiring a clear volumn of space throughout a large cylindrical area. U.S. Pat. No. 1,621,815 to Schueller proposes an arrangement which separates the overall system into two interconnected assemblies, but the yaw and turning motions of the assemblies are superimposed on both the roll and pitch axes of the stabilized platform.

A further problem in mechanically stabilized systems involves destabilization from yaw/turning motions combined with roll or pitch motions. Such destabilization results from the motions being converted into platform disturbing torques by the gyros whenever the gyro spin axes are not exactly vertical. If a gyro spin axis is exactly vertical, then rotations of the gyro support frame about the vertical axis, as in yaw or turning, will have no effect. However, if the gyro spin axis has precessed some angle away from vertical as a result of reacting to a disturbing torque about the roll or pitch axis, then a component of the gyros angular momentum will exist in the horizontal plane. If there are no motions in the horizontal plane then nothing will happen, but if horizontal rotations do occur they will be coupled into the platform by the gyro's horizontal component of momentum and will tend to mis-level the platform. Significant errors in platform orientation can occur, and in extreme cases the platform will become completely destabilized.

One approach to solving the problem of combined motions is described in U.S. Pat. No. 2,199,294 to Seligmann wherein the entire platform system is stabilized about a vertical axis relative to the meridian. In particular, the entire platform system is slaved to the meridian. A similar arrangement disclosed in U.S. Pat. No.

4,020,491 to Bieser et al. slaves the entire platform to the ship's compass. In addition, the Bieser et al. patent suggests the use of structural means to lock the gyro during rapid turning maneuvers to minimize torquing errors. Of course, if the gyros are locked or otherwise caged during turning maneuvers, they cannot react to disturbances which tend to destabilize the platform. U.S. Pat. No. 4,193,308 to Stuhler et al. describes a fluid dashpot caging system for a stabilized platform in which the entire system may be rotatably mounted on a pedestal to permit azimuth orientations of the platform. Such azimuth orientation motions, if occurring simultaneously with roll or pitch motions, would of course cause the above-described torquing errors.

SUMMARY OF THE INVENTION

The first main feature of this invention provides for the platform system to be statically compositely balanced about its support axis and to include automatic reference orienting means which include an auxiliary non-rigidly coupled pendulum. This feature of the invention consists of constructing a statically balanced platform system incorporating gyroscopic torsional impulse absorption system as above defined, into the platform system so that it has a nominally vertical axis and is supported by a universal pivotal support means on an unstable structure, such as a ship's deck. A separate pendulum is supported by pivotal means for gravitational movement independent of the position, or attitude, of the gyroscopic torsional impulse absorption system, the platform and the unstable structure. A non-rigid coupling means between the statically balanced platform system and the separate pendulum provides a gravity reference for long term stability of the platform system. In one embodiment the separate pendulum is independently pivotally supported by the unstable structure; in a second embodiment, by the platform; and, in a third embodiment, by the gyroscopic torsional impulse absorption system. A second feature of the invention includes constructing the statically balanced platform system with the gyroscopic torsional impulse absorption system both pivotally and rotatably mounted on the nominally-vertical axis so that it remains essentially free of azimuthal motion during yawing and turning of the unstable structure (the ship) and also when the stabilized platform and equipment mounted thereon is independently rotated in azimuth. The differences between previously known systems which are rigidly pendulous, and a system constructed in accordance with the present invention which is both statically balanced and non-rigidly coupled to an auxiliary pendulum, heretofore overlooked by all of the prior art, are fundamental to the unforeseeable improvements discovered by me. In rigidly pendulous systems of the prior art, the dynamic characteristics are essentially immutable, whereas almost any desired set of dynamic characteristics can be designed and built into systems constructed in accordance with the present invention. To illustrate: if a rigidly pendulous system of given weight/inertia is to have a given torque gradient-toward-vertical then there exists only one value for the pendular length. But this pendular length—pendular weight/inertia combination will have a characteristic natural period of oscillation over which the designer has no control. Torque gradient as used herein is defined as having the dimensions of inch-pounds per degree, or other equivalent units. By contrast, in a statically balanced-plus-auxiliary pendulum system a given torque gradient-toward-vertical can be obtained with an infinite variety of pendulum weight/pendulum length combinations. And makes possible a combination which produces any pre-selected value for the period of natural oscillation. This has important consequences for practical stabilization systems because such systems should have natural oscillation periods which will not be excited in their operating environment. For example, ship vibrations fall into two separate bands in the frequency spectrum; those with periods in the range of about 0.02 to 0.25 seconds caused by the propulsion system and other machinery, and those in the range of about 4 to 100 seconds caused by gross ship and wave motions. Between these two bands there is a "window" in the frequency spectrum, from about 0.25 to 4 Hz, which is almost free of vibrations. The auxiliary pendulum with its suspension and coupling in the present invention is designed to have a natural period which falls within this band so that it is left essentially free of shipboard excitations. In contrast, rigidly pendulous systems as taught in the prior art characteristically have natural periods in the range of 10 to 30 seconds which make them susceptible to excitation, and hence orientation inaccuracies, from gross ship and wave motions. This is, in fact, the second major effect referred to above which limits the accuracy of pendulous mechanically stabilized platform systems as taught in the prior art.

It should be noted that a statically balanced stabilized platform system does not require the continuous application of reference orienting means; such means need be applied only long enough and frequently enough to prevent the accumulation of drift and wandering errors. The present invention allows for reducing the coupling effect between platform and auxiliary pendulum under conditions when the pendulum is subject to orientation errors, such as from horizontal accelerations induced by ship motions. Such de-coupling is not possible in rigidly-pendulous platform systems. This feature in the present invention is used in conjunction with the other features described herein and accordingly allows construction of much more accurate mechanically stabilized platform systems than were heretofore possible.

The phrase "statically compositely balanced," or simply "compositely balanced," as used above refers to the condition in a system wherein the pivotal members will remain at any intitial orientation in the presence of an accelerating field, such as gravity. For an assembly pivotally mounted to a supporting structure about a single axis this condition will exist if the center of gravity of the system lies on the pivotal axis. For a system composed of two interconnected rigid assemblies, each of which is separately supported on its own pivotal axis, this condition will exist if any unbalance of one assembly about its pivotal axis is compensated by an equal but opposite unbalance of the other assembly about its pivotal axis. Arranging for the system to be statically compositely balanced makes it insensitive to all accelerations. The advantages therefrom have been noted above.

In the present invention the long-term reference orientation established by the auxiliary pendulum is transferred to the stable platform by non-rigid coupling means therebetween. The components used for this coupling can be designed to provide many kinds of torque restoration functions through selection and design of combinations of various devices which produce forces or torques, such as linear springs, non-linear springs, dash-pots, magnets and other magnetic devices, and various other pneumatic, hydraulic, electric and mechanical devices. Inclusion of viscous damping or other energy-absorbing mechanisms in the torque restoration function for the purpose of damping out platform oscillations is desirable.

An example of a desirable torque restoration function is one which creates an increasing torque with increasing angular displacements for small displacements, and which maintains that torque at a constant value for all larger displacements, and which includes a damping factor. Another example of a desirable torque restoration function is one which provides strong coupling during periods when the pendulum has small vertical errors, and which provides only weak or even no coupling at all when the pendulum has large vertical errors.

A second feature of this invention provides for the stabilization system to be constructed as two separate but inter-connected assemblies, each part of which is optimally designed for its particular functions. The two assemblies comprise the stabilizing assembly, and the stabilized platform including its operating equipment. These two assemblies are interconnected with any of a variety of position or motion transmitting means such that the stabilized platform always has the same angular orientations with respect to a reference plane as does the stabilizing assembly.

Significant improvements in size, weight, and stiffness characteristics result from this feature of the present invention. It also allows stable platforms not originally designed for direct mechanical stabilization to be economically converted to that type. A further advantage of this feature is that it permits the stabilizing assembly to be placed at a location where its operating environment is less severe than that imposed on the operating equipment which it stabilizes. For example, the assembly could be mounted below deck rather than on a mast exposed to the elements. Still another advantage of this feature is that larger disturbing impulse absorbing capacity can be obtained from a given amount of gyro momentum as a result of having greater spatial design freedom, hence allowing large gyro precession axis operating ranges.

As noted at the beginning of this section a second important feature of this invention provides for mounting the gyroscopic torsional impulse absorption system on its own support frame on independent azimuth bearings for rotatable mounting on the nominally-vertical axis of the platform system such that the frame has essentially unrestrained, or free, aximuthal motion about said axis which itself is above the universal support means of the platform system. This arrangement minimizes the problems associated with yaw/turning combined with roll or pitch motions described above because the gyro assemblies experience only slight azimuth motions with respect to inertial space. Hence as far as the gyro assembly support frame is concerned yaw or turning motions effectively do not occur. An observer could note relative motion occurring between the gyro support frame and the ship but it would in fact represent the support frame remaining static in inertial space while the ship turned under it. Similarly, the gyro assembly support frame is left essentially undisturbed in azimuth when the platform, or the antenna or other equipment mounted on the stabilized platform, is rotated in azimuth, as a consequence of said gyro assembly support frame being mounted on its own, independent, azimuth bearings. In both instances the gyro assembly support frame is left unrestrained and unforced to rotate. Hence, it is at all times free to remain at its initial azimuth position in inertial space.

From the above description it should be clear that this invention involves three independent but inter-related features. An optimum stabilized system according to the teachings herein would be (1) statically balanced with auxiliary pendulum centering means, (2) would be constructed as two separate but interconnected assemblies, and (3) would utilize a gyro assembly support frame mounted on its own azimuth bearings. Other configurations may of course be constructed which do not incorporate all three of these features, nevertheless use of any one feature alone, or with either or both of the others represents substantial and unexpected improvement over the prior art.

For a fuller understanding of the principles which apply to this invention and of the descriptions which follow, it will be noted that a mechanically stabilized platform system operates on the equivalency and convertibility of torsional impulse and angular momentum. Torsional impulses which tend to disturb the platform are resisted by changes in the angular momentum of the system. These changes appear in the form of gyro spin axis reorientation, usually referred to as precession. When a disturbing torque occurs the gyro first goes through a transient oscillating motion about its precession axis, and then begins to rotate about that axis at a constant rate. In the process a small angular offset occurs to the platform. Precession will continue until either the torque is removed, or the gyro reaches a precession angular limit, whichever occurs first. When the disturbing torque is removed precession ceases and the platform's angular offset is corrected by the reference orientation means employed. These effects can be described and analyzed by means of the general equations for rotation of a body about its mass center.

DESCRIPTION OF THE PREFERRED EMBODIMENTS

Figure 1:
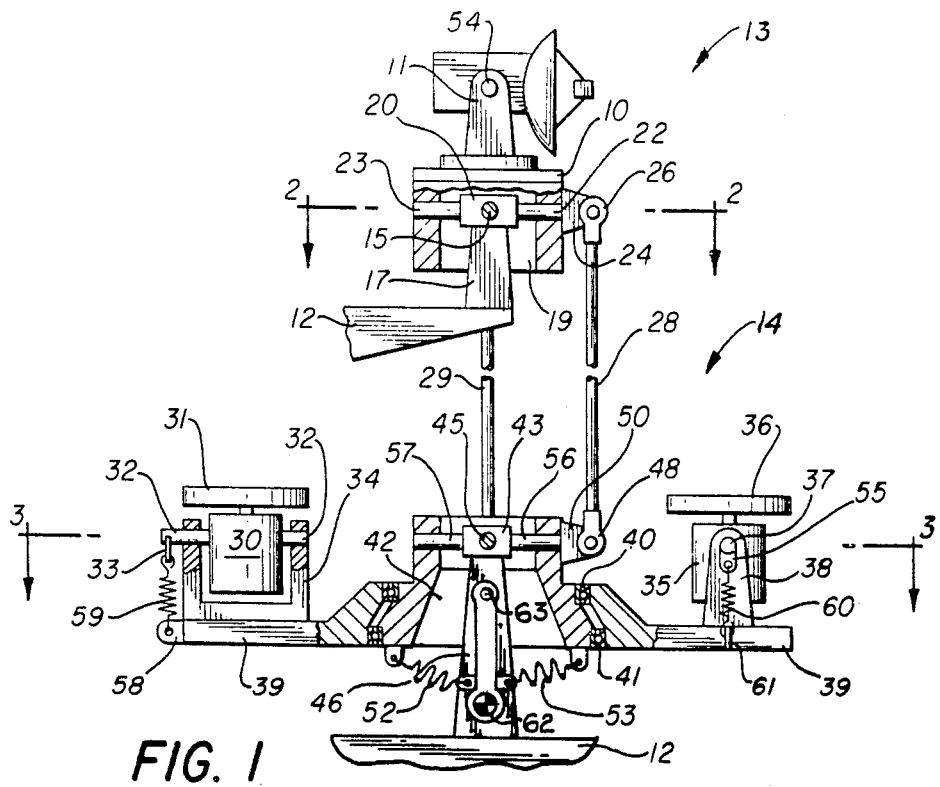
FIG. 1 is a partially broken away and sectioned side elevation view of one embodiment of the present invention. The upper portion of FIG. 1 represents the stabilized platform of such a system and the lower portion represents the stabilizing assembly portion.
Figure 2:
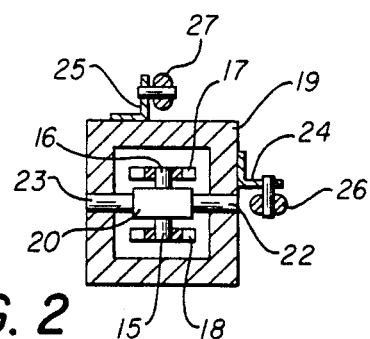
FIG. 2 is a horizontal section taken along line 2—2 in FIG. 1 showing the right angled gimbal mounting detail.

Referring first to FIG. 1, it can be seen that platform structure 10 of equipment platform 13 supports operating equipment 11 such as a directional microwave antenna or radar apparatus. The equipment platform is defined herein as including all operating equipment mounted thereon. Operating equipment 11 is rotatably mounted on platform structure 10 and typically is slaved to follow the ship's gyro compass. Platform structure 10 itself is supported by the upper gimbal ring 19, which is pivotally mounted on the upper spider spindles 22 and 23. Referring now to FIG. 2, upper spider 20 is pivotally mounted on upper support spindles 15 and 16, which are supported by upper trunnions 17 and 18, which in turn are attached to the support structure 12. The axes of spindles 22 and 23 are shown to be co-linear and perpendicular to the co-linear axes of spindles 15 and 16. Both of these co-linear axes lie in the same plane and form a universal pivotal support means having a pair of orthogonal intersecting axes.

Figure 3:
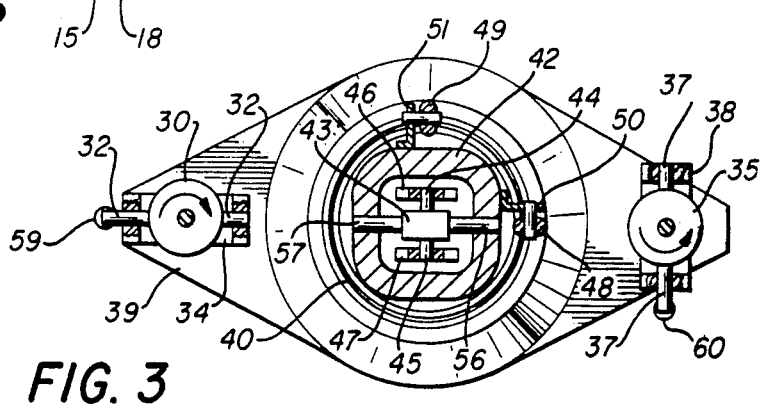
FIG. 3 is a horizontal section taken along line 3—3 in FIG. 1 showing the right angled gimbal and gyro mounting detail.

Gimbal brackets 24 and 25 attached to upper gimbal ring 19 support pivotally-mounted upper ball joints 26 and 27 with their pivotal centers lying respectively on spindle axes 22 and 23, and 15 and 16. Push-rods 28 and 29 are attached respectively to ball joints 26 and 27 at one end, and as shown in FIGS. 3, to lower ball joints 48 and 49 at their other end. Gimbal clips 50 and 51 support lower ball joints 48 and 49 and are themselves attached to lower gimbal ring 42 which is supported on lower spider spindles 56 and 57. Lower spider 43 supports spindles 56 and 57 and itself is pivotally supported by lower support spindles 44 and 45 which are supported by lower trunnions 46 and 47. The pivotal axis represented by spindles 56 and 57 is perpendicular to the pivotal axis represented by spindles 44 and 45 and form another universal pivotal support means having a pair of orthogonal intersecting axes. Both of these axes lie in the same plane. Lower trunnions 46 and 47 are mounted at another place on support structure 12 from that which supports upper trunnions 17 and 18.

The axes represented by lower support spindles 44 and 45, and 56 and 57, are parallel respectively to the axes represented by upper support spindles 15 and 16, and 22 and 23. Azimuth bearings 40 and 41 are universally pivotally supported by lower gimbal ring 42 and themselves provide support for gyro azimuth frame 39 to rotate about an axis at right angles to the pivotal axes. Azimuth frame 39, on which are mounted an independent pair of gyro mounting frames 34 and 38 is free to rotate in inertial space relative to the pivotal support. Gyro motor 30 and rotor 31 are pivotally supported on gyro pivot spindles 32 in gyro mounting frame 34. Gyro motor 35 and rotor 36 are pivotally supported on pivot spindles 37 in the gyro mounting frame 38. The pivot axis of gyro motor 30 is perpendicular to the pivotal axis of gyro motor 35. Although pivot spindles 32 are shown parallel to pivot spindles 56 and 57, these axes need not necessarily be so oriented. Gyro motor with rotor 31 is statically balanced about pivot spindles 32; gyro motor 35 with rotor 36 is also statically balanced about pivot spindles 37.

Gyro spring 59 is connected to eccentric extension 33 of spindle 32 at one end, and to spring clip 58 at its other end. Spring 60 is similarly connected between spindle 37 eccentric extension 55 and spring clip 61. Stabilized platform assembly 13 is statically balanced about the axis of spindles 15 and 16 and also about the axis of spindles 22 and 23. Stabilizing assembly 14 including push-rods 28 and 29 and ball joints 26, 48, 27, and 49, is statically balanced about the axis of spindles 44 and 45 and also about the axis of spindles 56 and 57. Gimbal springs 52 and 53 are connected between lower gimbal ring 42 and pendulum 62 so as to orient lower gimbal ring 42 with respect to gravity about the axis of spindles 44 and 45. Two other springs, not shown, are similarly connected to a second pendulum, not shown, to orient gimbal ring 42 about the axis of spindles 56 and 57 with respect to gravity.

Figure 4:
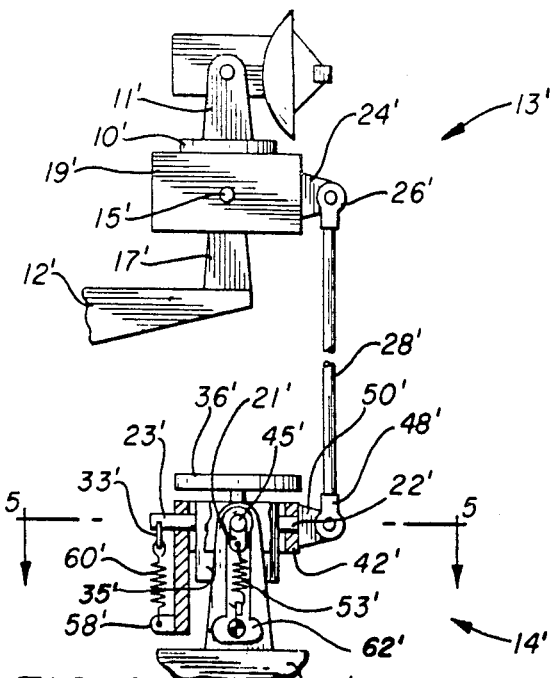
FIG. 4 is a partially broken away and sectioned side elevation view of a second embodiment of a mechanically stabilized platform system in which there is a single stabilized pivotal axis.
Figure 5:
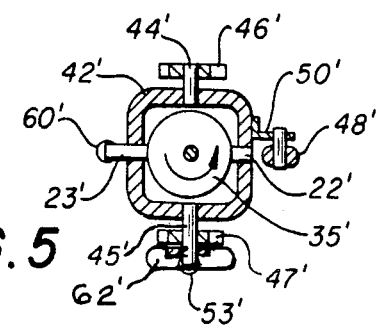
FIG. 5 is a horizontal section taken along line 5—5 of FIG. 4 showing the gyro mounting gimbal.

In FIG. 4, an embodiment of this invention is shown in which a single-axis stabilized platform is employed. Pivot axis spindles 15' are rotationally supported in trunnions 17' mounted on support structure 12'. Gyro motor 35' is statically balanced with respect to its support spindles 22' and 23' which are rotationally mounted in lower gimbal ring 42'. Ring 42' is supported on spindles 44' and 45' which in turn are supported in lower trunnions 46' and 47' as shown in FIG. 5. Gyro pivot spring 60' is connected to eccentric extension 33' of spindle 23' at one end and at its other end to spring clip 58' which is attached to lower gimbal ring 42'. Gimbal spring 52' is connected between eccentric extension 21' of spindle 45' and tabs on pendulum 62'. The stabilized platform assembly 13' and the stabilizing assembly 14' including push-rod 28' and ball joints 26' and 48' are statically balanced about their respective support spindles 15' and 44' and 45', either individually or compositely.

Figure 6:
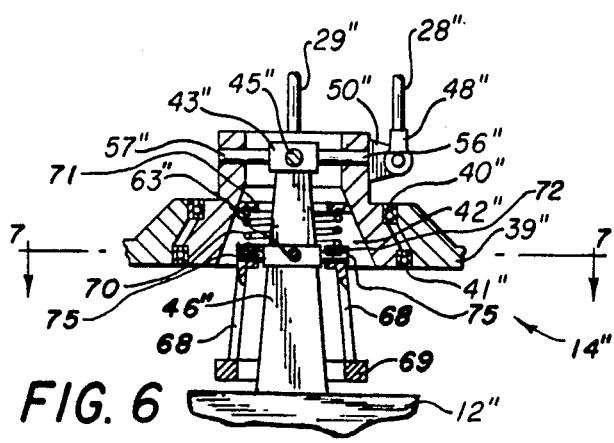
FIG. 6 illustrates a portion of a third embodiment in which a single coil spring is used as part of the system's reference orientation means.
Figure 7:
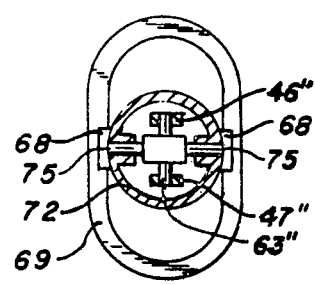
FIG. 7 is a horizontal section taken along line 7—7 in FIG. 6.

In FIGS. 6 and 7, trunnions 46" and 47" carry gimbal spindles 63" which together with spindles 75 comprise a spider which pivotally supports outer gimbal ring 72 on spindles 75. Pendulum ring 69 is rigidly connected to outer gimbal ring 72 by means of struts 68. This overall arrangement provides pendulum ring 69 with pivotal freedom about two mutually perpendicular axes.

Coil spring 70 rests in a groove in the upper surface of outer gimbal ring 72 at its lower end, and in a groove ring 71 which is attached to lower gimbal ring 42" at its upper end. Excluding pendulum ring 69 with struts 68 and coil spring 70, stabilization assembly 14" is statically balanced about both orthogonal axes of spider 43". Thus the composite assembly comprised of stabilization assembly 14" and the stabilized platform assembly, now shown, including push-rods 28" and 29", is non-rigidly oriented with respect to gravity in two dimensions by pendulum ring 69 as a result of the coupling provided by coil spring 70.

Figure 8:
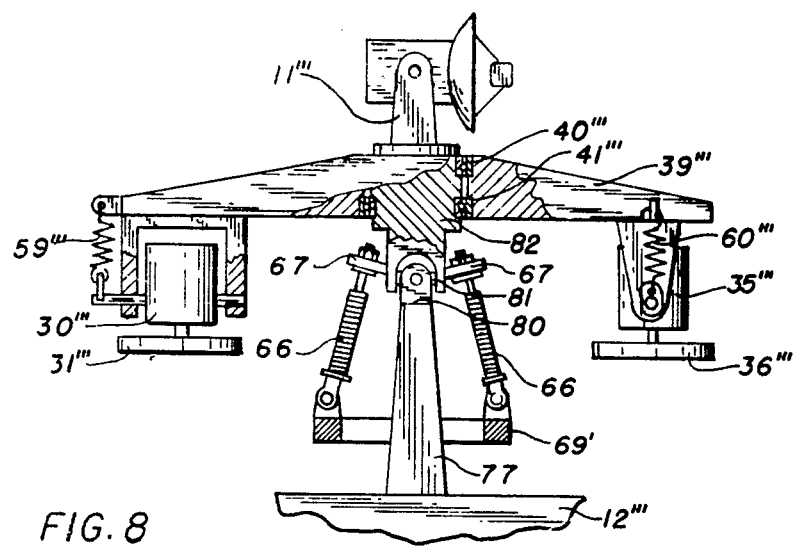
FIG. 8 is a partially broken away and sectioned side elevation view of another embodiment in which the equipment being stabilized is mounted directly on the stabilization assembly.

In FIG. 8 an embodiment of this invention is shown wherein the stabilized system is constructed as one integrated assembly. In the Figure post 77 mounted on support structure 12''' carries a universal joint consisting of lower yoke 80, upper yoke 82, and hidden internal cross 81. Yokes 80 and 82 pivot on the right-angled spindles of cross 81 so as to comprise a gimbal assembly.

The upper extension of yoke 82 constitutes a stable platform on which operating equipment 11''' is mounted. The upper extension of yoke 82 also supports azimuth bearings 40''' and 41''' which in turn rotationally support gyro frame 39'''. The entire assembly comprised of upper yoke 82, operating equipment 11''', and gyro frame 39''' including all components attached thereto, is statically balanced about the two orthogonal axes of internal cross 81. Gyro frame 39''' is provided with two gyro assemblies comparable to those shown in FIGS. 1 and 6.

Figure 9:
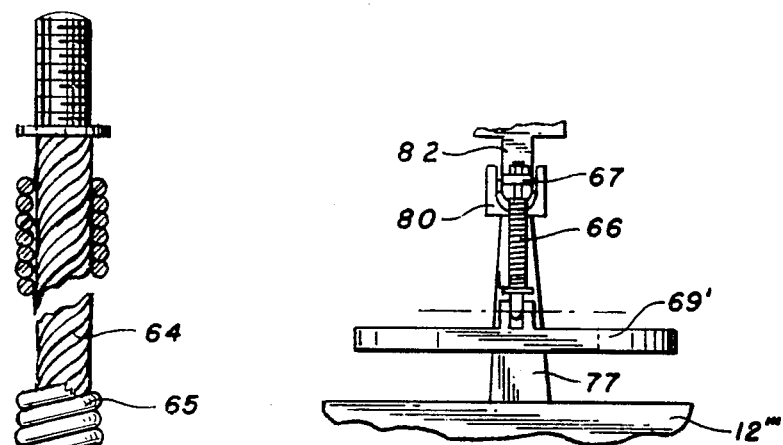
FIG. 9 is a partial front elevation of the embodiment shown in FIG. 8.

Cable clips 67, attached at diametrically opposite positions on upper yoke 82, rigidly support pendulum cables 66 at their upper ends. At their lower ends pendulum cables 66 are pivotally connected to clips on pendulum ring 69' in the plane of FIG. 8, but are rigidly connected to pendulum ring 69' in the plane shown in FIG. 9. Thus the steady-state, or average, orientation of pendulum ring 69' is imparted symmetrically and with equal coupling stiffness in two orthogonal planes to upper yoke 82.

Figure 10:
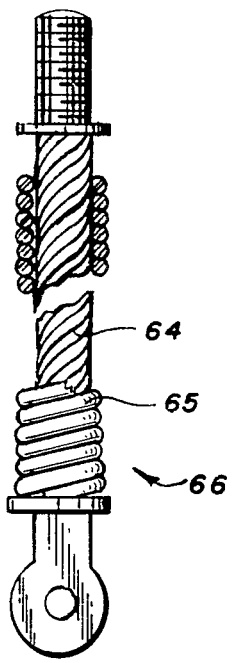
FIG. 10 is a partially broken away and sectioned detail of one of the auxiliary pendulum non-rigid support members shown in FIGS. 8 and 9.

Referring now to FIG. 10, pendulum cable 66 is shown to be comprised of an inner flexible core 64, such as a multi-strand steel cable, and an outer cover consisting of a closely would coil spring case 65. The annular space between core 64 and case 65 is filled with a viscous medium, such as a petroleum grease. Relative motion between core 64 and case 65 which occurs whenever pendulum cable 66 flexes creates shearing displacements throughout the viscous medium which thereby absorb a portion of the energy causing cable flexure in the first place.

Figure 11:
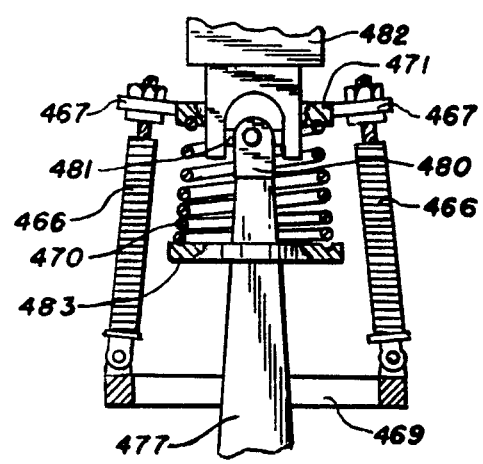
FIG. 11 is a partially broken away and sectioned partial view of another embodiment wherein a reference orientation for the stabilized portion of the system is established by a non-rigidly coupled auxiliary pendulum acting in combination with a single coil spring mounted on the support structure.

In FIG. 11 an embodiment of this invention is shown wherein the reference orienting effect of pendulum ring 469 is complemented and modified by the reference orienting effect of coil spring 470. Grooved ring 483, which is rigidly attached to support post 477, supports coil spring 470 at its lower end while the upper end of coil spring 470 rests in a groove in ring 471 which itself is attached to upper yoke 482. Coil spring 470 may be constructed so as to possess pre-selected non-linear stiffness-versus-deflection characteristics. The advantages of such construction are discussed below.

DESCRIPTION OF OPERATION

In operation, gyro motors 30 and 35 drive their respective rotors 31 and 36 in opposite directions at some nominal design speed, typically in the range of 600 to 6,000 rpm. The two motors need not operate at the same speed. In the absence of any disturbance the system will find and maintain the orientations indicated in FIG. 1. Note however that gyro azimuth frame 39 is essentially unrestrained in azimuth and hence is free to take any azimuth orientation. For the sake of illustration assume that gyro frame 39 initially is in the position shown in FIGS. 1 and 3.

Now suppose structure 12 oscillates about an axis parallel to the axis of trunnion 15 as would be caused by a ship's rolling motion. Lower gimbal ring 42 and upper gimbal ring 19 will tend to remain in their original orientations as a consequence of their mass moment of inertia. Any accelerations which accompany the oscillations of support structure 12 or any other extraneous accelerations which may occur will have no effect on the statically balanced portions of the system, which is the entire system except for the reference orienting pendulum, because they are compositely statically balanced about all motion axes. However, varying torques tending to disturb lower gimbal ring 42 orientation will be induced by springs 52 and 53 whenever pendulum 62 has been deflected by horizontal accelerations. These disturbing torques, acting over finite periods of time, become torsional impulses which tend to re-orient lower gimbal ring 42 about spindles 45 and 44. Such re-orientation is resisted, however, by the process of gyro precession; gyro motor with rotor 31 absorbs the imposed torsional impulses by undergoing angular momentum changes, specifically by changing its spin axis orientation about spindle 32. The speed of motor 30 with rotor 31 is essentially unaffected. Gyro motor 30 will be gently urged back toward its initial center position during and after any precession motion by spring 33 acting on eccentric extention 33 of spindle 32.

When oscillations of support structure 12 occur in the orthogonal direction to that described above, comparable to a ship's pitching motion, the same effects will occur but the disturbing torques will be induced by the orthogonal counterparts to springs 52 and 53 and pendulum 62, and the resisting torques will be generated by gyro motor 35 with rotor 36 by its precessing about pivot spindles 37. Motion of support structure 12 simultaneously in both directions, corresponding to a ship experiencing both roll and pitch motions, will result in the simultaneous occurrence of both of the consequential effects described above.

When support structure 12 rotates about a vertical axis, comparable to a ship's turning motion in azimuth, gyro azimuth frame 39 will tend to remain static in its initial position as a consequence of its mass moment of inertia. If support structure 12 now rolls at this new azimuth position any disturbing torsional impulses induced by springs 52 and 53 from pendulum 62 will be resisted by precession motions of both gyro motor with rotor 31 and gyro motor 35 with rotor 36 as each assembly reacts to its components of the disturbing torsional impulses.

If operating equipment 11 is rotated in azimuth on platform structure 10 no disturbing torques will be induced in the system because any torques accompanying such motion will be reacted by spindles 22 and 23, and thence to spindles 15 and 16, to trunnions 17 and 18.

If the system's angular momentum change capacity is exceeded, such as can occur if support structure 12 rotates beyond the platform's angular operating range one or both of the gyro motors 30 and 35 will rapidly drive itself to a precession angular motion limit position and the system will thereupon become completely unstable. The system will immediately begin to erect itself however, and within one or two minutes after the operating angular motion limit was last exceeded the system will become essentially stable again. This graceful re-stabilization characteristic of the present invention is markedly different from the re-stabilization behavior of rigidly pendulous mechanically stabilized systems which, after once having been tumbled will continue to be destabilized until, by fortuitous circumstances, the angular motion limits and the integrated disturbing impulse correcting capacity of the gyros are not exceeded over one complete oscillating cycle of the ship. The aforesaid fortuitous circumstances typically will occur for rigidly pendulous systems within ten to one hundred oscillating cycles of support structure 12, depending on how closely the total motion amplitude of support structure 12 approaches the useful operating range of the stabilized platform system.

The embodiment shown in FIG. 4 does not have immunity to azimuth motions of the support structure as is provided by the embodiment shown in FIG. 1. This embodiment is therefore most useful in those applications, which have negligibly small motions about one axis, e.g. pitch, and which also experience only slow yaw/turning rates. This situation exists for very large crude oil carrying ships.

In the embodiment illustrated in FIGS. 1, 4, 6, and 8 it will be noted that horizontal accelerations caused by ship rolling and pitching motions, and which cause the reference orienting pendulum 62, 62', 69 or 69' respectively to be non-vertical, will tend to mis-orient the stabilized portions of the system in a direction which is opposite to the motion itself. For example, in a rolling motion of a ship to the right from vertical the pendulum will tend to create an error toward the left in stabilized platform orientation. It will be noted further that coil spring 470 in FIG. 11 will tend to mis-orient the stabilized platform in the same direction as ship motion; in a rolling motion to the right from vertical the coil spring will tend to create an error also to the right in stabilized platform orientation. These opposite effects are combined in the embodiment shown in FIG. 11 to minimize the mis-orienting effects of either the pendulum, or the spring-to-support-post reference orienting means taken by itself.

It also will be noted that horizontal accelerations acting on the auxillary pendulum 469 in FIG. 11 can be represented by trigonometric expressions, as proposed in U.S. Pat. No. 1,083,370—Luyken, for example. Further, approximations to such trigonometric expressions, but of the opposite sense, can be obtained for the force versus deflection relationship of coil spring 470 by winding it, for example, to have both taper and non-uniform coil spacing. Thus, the embodiment shown in FIG. 11 allows significant reductions in the error-causing effects of the reference orienting pendulum under operating conditions involving appreciable ship motions having attendant appreciable horizontal accelerations.

Although the embodiments of this invention shown in the FIGURES and described herein indicate the use of one or two gyros with their spin axes oriented to be nominally vertical, it should be understood that other gyro arrangements are equally applicable. Among such permissible alternative arrangements is a four-gyro array generally in a form as described in U.S. Pat. Nos. 1,236,993—Sperry or 1,083,370—Luyken, the horizontal spin axis arrangements described in U.S. Pat. Nos. 1,645,079—Titterington or 1,573,028—Bates and the over/under arrangement suggested in U.S. Pat. No. 1,324,477—Tanner. Also, an end-to-end arrangement generally as described in U.S. Pat. No. 3,742,770—Flannelly can be substituted for the gyro arrangements depicted above. All such alternative arrangements would of course, in accordance with my invention, be statically balanced and non-rigidly coupled to an auxiliary reference orienting pendulum as described above.

So, it should be understood that although the word "invention" has been used in a singular sense, it may include a number of separate and distinct features. These features may be practiced in various combinations, as exemplified by the disclosed embodiments, but it should be appreciated that each may also be practiced independently of the others. For example, a stabilized platform system according to this invention may include a statically balanced, integral-type unit in which the gyro azimuth frame 39 is rigidly attached to lower gimbal ring 42 rather than mounted on its own azimuth bearings 40 and 41. Also, a rigidly pendulous stabilized system as presently known in the art may be modified according to this invention to include free azimuth mounting of the gyro support frame.

Finally, the embodiments shown in the figures are intended to be representative and not inclusive. For example, the addition of damping means, caging means, or power transmission means such as slip rings or rotary air gap transformer would not change the basic character of this invention. Accordingly, while only five specific embodiments of this invention have been illustrated and described, it is understood that various modifications and changes will become obvious to those skilled in the art. Such modifications and changes may be made without departing from the true scope and spirit of this invention.

I claim:

1. In combination, a support structure, a gyroscopic torsional impulse absorption system, said system comprising gyroscopic apparatus including at least a pair of independently mounted gyroscopic rotors having their spin axes and their precession axes oriented so that their torque axes are mutually perpendicular to each other, universal pivotal supporting means for mounting said absoption system on said support structure, a pendulum, said pendulum being pivotally supported as a separate element for gravitational movement independent of the position of said support structure and said supporting means, and non-rigid coupling means operatively connected between said pendulum and said gyroscopic torsional impulse absorption system for imparting a gravity reference to said system.

2. The system of claim 1 wherein said non-rigid coupling means includes a spring.

3. The system of claim 1 wherein said pendulum includes elastic suspension means.

4. The system of claim 1 wherein said pendulum is elastically suspended from said gyroscopic torsional impulse absorption system.

5. The system of claim 1 wherein said non-rigid coupling means includes energy absorbing means.

6. In combination, a gyroscopic torsional impulse absorption system, supporting means, and a platform to be stabilized by said system, said gyroscopic torsional impulse absorption system mounted on a universal pivotal axis on said supporting means and including rotatable means between said pivotal axis and said absorption system whereby rotational motion in inertial space of said supporting means about an axis at right angles to said pivotal axis is isolated from said gyroscopic torsional impulse absorption system with respect to inertial space about said axis, said rotatable means being independent of said platform, and said platform being universally pivotally mounted relative to said supporting means and oriented with respect to said gyroscopic torsional impulse absorption system by connection means therebetween.

7. In combination a gyroscopic torsional impulse absorption system, supporting means, a platform to be stabilized by said absorption system, and a pendulum, said gyroscopic torsional impulse absorption system mounted on a universal pivotal axis on said supporting means and including rotatable means between said pivotal axis and said absorption system whereby rotational motion in inertial space of said supporting means about an axis at right angles to said pivotal axis is isolated from said gyroscopic torsional impulse absorption system with respect to inertial space about said axis, said rotatable means being independent of said platform, said platform being universally pivotally mounted relative to said supporting means and oriented with respect to said gyroscopic torsional impulse absorption system by connection means therebetween, and non-rigid coupling means operatively connected between said pendulum and the gyroscopic torsional impulse absorption system for imparting a gravity reference to said system.

8. The system of claim 7 wherein said non-rigid coupling means includes a spring.

9. The system of claim 7 wherein said pendulum includes elastic suspension means.

10. The system of claim 7 wherein said pendulum is elastically suspended from said gyroscopic torsional impulse absorption system.

11. The system of claim 7 wherein said non-rigid coupling means includes energy absorption means.

12. A mechanically stabilized platform system adapted to be mounted on a supporting structure comprising:
 a stabilizing assembly pivotally mounted about a first pair of orthogonal intersecting axes, said assembly including a gimbal ring, a gyro azimuth frame rotatably mounted on said gimbal ring for rotation in a plane parallel to said intersecting axes, a pair of gyro assemblies pivotally mounted for precession about a corresponding pair of axes perpendicular to the spin axes of their respective gyro assembly, each of said gyro assemblies including means for orienting said gyro assemblies with respect to said azimuth frame;
 an equipment platform pivotally mounted about a second pair of orthogonal intersecting axes, each of said second pair of axes being parallel to and spaced apart from a corresponding member of said first pair of axes;
 means interconnecting said equipment platform and said stabilizing assembly for maintaining a predetermined relative angular orientation therebetween;
 means for compositely statically balancing said mechanically stabilized platform system about its support axes;
 pendulum means independently suspended relative to said stabilizing assembly and said platform for orienting said stabilizing assembly including spring means extending between said platform assembly and said pendulum.

13. The system of claim 12 including additional spring means extending between said stabilizing assembly and the supporting structure for orienting said stabilizing assembly.

14. In combination, a gyroscopic torsional impulse absorption system, a universal pivotal supporting means for mounting said absorption system on a support structure, a pendulum separately pivotable in response to gravity independent of the position of said support structure and said pivotal support means, non-rigid coupling means operatively connected between said pendulum and said pivotal supporting means, and resilient means operatively connected between said pivotal supporting means and the support structure.

15. The system of claim 1 including means for compositely statically balancing said gyroscopic torsional impulse absorption system about said pivotal supporting means.

16. The system of claim 1 wherein said pendulum, in combination with said non-rigid coupling means, includes means whereby the natural period of oscillation of said combination falls in the range of 0.25 to 4.0 seconds.

17. A mechanically stabilized antenna pedestal comprising:
 support means for supporting an antenna on an unstable structure, said support means including universal coupling means between said unstable structure and said antenna; and
 stabilizing means mounted on the antenna side of said universal coupling means of said support means for directly stabilizing said antenna support means, said stabilizing means including gyroscope motor and rotor means, said stabilizing means being mounted for free azimuth rotation relative to and independently of the positions of both said unstable structure and said antenna support means.

18. The antenna pedestal of claim 17, wherein said support means comprises a vertically disposed lower support member connected to a vertically disposed upper support member through a universal gimbal assembly, with said stabilizing means being mounted on bearings on the upper support member for rotation about a vertical axis of said upper support member.

19. The mechanically stabilized antenna pedestal of claim 17, wherein said stabilizing means includes first and second gyroscope motor and rotor means mounted for universal pivotal movement about mutually orthogonal axes, and pendulum weight means universally pivotally mounted for gravity motion independent of the position of said support means and said unstable structure to provide a vertical reference.

20. The mechanically stabilized antenna pedestal of claim 20, inluding an antenna mounted on said upper support member, said antenna including means for supporting the antenna on said upper support member for rotation about said vertical axis and for rotation about an axis perpendicular to said vertical axis.

21. The mechanically stabilized antenna pedestal of claim 18, wherein said stabilizing means includes a pendulum weight universally pivotally supported for gravity motion from said support member and disposed beneath said universal gimbal assembly.

22. The mechanically stabilized antenna pedestal of claim 21, wherein said pendulum weight is in the form of a ring encircling the lower support member and wherein said ring is resiliently supported from said upper support member.

23. A mechanically stabilized platform system comprising:
 a vertically disposed support means having an upper support member and a lower support member connected together through a universal coupling means; and
 stabilizing means mounted on said upper support member, said stabilizing means including gyroscopic stabilizing means, and separate pendulum means providing a vertical reference, said pendulum means being universally pivotally supported for gravitational movement independent of the positions of said upper support member or said lower support member, said pendulum means including a weight in the form of a ring encircling said lower support member and non-rigid connecting means between said pendulum means and said upper support member to impart a gravity reference to said upper support member.

24. The mechanically stabilized platform system of claim 23, wherein said ring is suspended on resilient coupling means.

25. The mechanically stabilized platform system of claim 24, wherein said resilient coupling means includes a spring.

26. The mechanically stabilized platform system of claim 23, wherein said gyroscopic stabilizing means includes first and second gyroscope motor and rotor means mounted for pivotal movement about mutually orthogonal axes, and means for urging each of said gyroscope motor and rotor means to a predetermined position the respective pivotal mounts.

27. The mechanically stabilized platform system of claim 23, wherein said ring has a larger inside dimension in one direction than in another orthogonal direction.

28. Apparatus for mechanically stabilizing equipment on an unstable structure comprising:
- a first support member mountable on to the unstable structure;
- a second member for supporting said equipment, said second support member being connected to the first support member through a universal gimbal assembly;
- gyroscopic stabilizing means mounted on said second support member for free azimuth rotation relative thereto, said gyroscopic stabilizing means including gyroscopic torsional impulse absorption means acting directly on said second support member to maintain a predetermined orientation thereof; and,
- pendulum means universally pivotally mounted relative to said first and second support members, and non-rigid coupling means between said pendulum means and at least one of said support members for orienting said second support member with respect to a gravity reference.

29. Apparatus for mechanical stabilization of equipment on an unstable structure comprising:
- a support member mountable on the unstable structure;
- gyroscopic stabilizing means mounted on said support member through a universal gimbal assembly;
- separate two-axis pendulum means for maintaining a gravity slaved, generally vertical reference, in two orthogonal directions, independent of the position of said stabilizing means; and
- non-rigid coupling means for resiliently transmitting said generally vertical reference from said pendulum means to said gyroscopic stabilizing means.

30. The apparatus of claim 29, wherein said pendulum is pivotally mounted on said support member and said non-rigid coupling means includes springs connecting said separate pendulum to the gyroscopic stabilizing means to resiliently transmit to said stabilizing means gravitational motions of the pendulum relative to the support member.

31. The apparatus of claim 30, wherein said pendulum is in the form of a ring non-rigidly connected to said gyroscopic stabilizing means through resilient coupling means.

32. The apparatus of claim 30, wherein said gyroscopic stabilizing means includes a second support member connected through said universal gimbal assembly to said support member mounted on the unstable structure, said gyroscopic stabilizing means further including gyroscopic torsional impulse absorption means mounted on said second support member for free azimuth rotation with respect thereto, said second support member providing a stable support for said equipment.

* * * * *